US011350786B2

(12) United States Patent
Park et al.

(10) Patent No.: US 11,350,786 B2
(45) Date of Patent: Jun. 7, 2022

(54) BEVERAGE BREWING ASSEMBLY FOR A REFRIGERATOR APPLIANCE

(71) Applicant: Haier US Appliance Solutions, Inc., Wilmington, DE (US)

(72) Inventors: Seung-Yeong Park, Seongnam (KR); SeJeong Woo, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 467 days.

(21) Appl. No.: 16/374,846

(22) Filed: Apr. 4, 2019

(65) Prior Publication Data

US 2020/0315397 A1  Oct. 8, 2020

(51) Int. Cl.
*A47J 31/46* (2006.01)
*A47J 31/10* (2006.01)
*A47J 31/40* (2006.01)
*A47J 31/02* (2006.01)

(52) U.S. Cl.
CPC ............. *A47J 31/467* (2013.01); *A47J 31/10* (2013.01); *A47J 31/407* (2013.01); *A47J 31/461* (2018.08); *A47J 31/02* (2013.01); *A47J 31/40* (2013.01)

(58) Field of Classification Search
CPC ........ A47J 31/407; A47J 31/40; A47J 31/402; A47J 31/14; A47J 31/10; A47J 31/02; A47J 31/005
USPC ........................... 99/291, 304, 306, 322, 323
See application file for complete search history.

(56) References Cited

U.S. PATENT DOCUMENTS

| 639,131 | A | * | 12/1899 | Angus | A47J 31/525 |
| 3,587,444 | A | * | 6/1971 | Godel | A47J 31/106 |
| | | | | | 99/282 |
| 7,363,852 | B2 | * | 4/2008 | Mangiapane | A47J 31/057 |
| | | | | | 222/144 |
| 9,826,857 | B2 | * | 11/2017 | Shi | A47J 31/3695 |
| 10,641,547 | B2 | * | 5/2020 | Cronin | B65D 51/2807 |
| 2005/0133531 | A1 | * | 6/2005 | Crisp | B67D 1/04 |
| | | | | | 222/129.1 |
| 2017/0086473 | A1 | | 3/2017 | Ingold | |
| 2017/0095107 | A1 | * | 4/2017 | Chen | A47J 31/005 |
| 2018/0168385 | A1 | | 6/2018 | Boone et al. | |
| 2019/0339006 | A1 | * | 11/2019 | Cronin | F25D 29/00 |
| 2020/0093320 | A1 | * | 3/2020 | Thomas | A47J 31/525 |

FOREIGN PATENT DOCUMENTS

| KR | 101190147 B1 | 10/2012 |
| KR | 101398674 B1 | 5/2014 |
| KR | 101562179 B1 | 10/2015 |
| KR | 101595497 B1 | 2/2016 |
| WO | WO2015012529 A1 | 1/2015 |

* cited by examiner

Primary Examiner — Reginald Alexander
(74) Attorney, Agent, or Firm — Dority & Manning, P.A.

(57) ABSTRACT

A brewing assembly for a refrigerator appliance includes a dispensing assembly for selectively dispensing a flow of water within a chilled chamber of the refrigerator appliance. A pitcher is removably positioned below the dispensing assembly and includes an upper reservoir for receiving, storing, and slowly distributing the flow of water into a brew module positioned below the upper reservoir and comprising a plurality of canisters for receiving brewing contents and the flow of water to create a brewed beverage. A lower reservoir is positioned below the brew module for receiving the brewed beverage from the plurality of canisters.

19 Claims, 6 Drawing Sheets

BEVERAGE BREWING ASSEMBLY FOR A REFRIGERATOR APPLIANCE

FIELD OF THE INVENTION

The present subject matter relates generally to refrigerator appliances, and more particularly to beverage brewing systems and assemblies for refrigerator appliances.

BACKGROUND OF THE INVENTION

Typical beverage brewing processes include pouring hot water into beverage contents, e.g., ground coffee or tea leaves, and permitting the hot water to seep through the grounds to create the brewed beverage. For example, in a typical coffee brewing process, coffee grounds are steeped in, saturated, or otherwise mixed with hot water (e.g., around 200° F.) to create hot coffee. Heated water accelerates the brewing process and allows for heated coffee to be brewed in a matter of minutes. Another method of brewing coffee is a cold brew process during which coffee grounds are brewed without hot water. However, such a cold brewing process takes a significantly longer amount of time to brew, e.g., around five to twenty-four hours.

Generally, consumers have few options for cold brewing coffee systems. Many of the cold brewing coffee systems available are manufactured as dedicated units that may be placed on a kitchen countertop. Such units require constant manual water refilling and take up valuable countertop space. Moreover, users frequently prefer that their coffee grounds are steeped in relatively cold water, but conventional cold brew coffee systems do not have a means for cooling or maintaining the cold temperature of the brewing water. This may produce unsatisfactory coffee. Further, after the coffee is brewed by such conventional systems, the produced coffee may be relatively warm (e.g., room temperature), requiring the user to move the brewed coffee to a chilled chamber to chill the coffee to the desired temperature.

Accordingly, an improved brewing assembly for cold brew beverages would be useful. More specifically, a cold brew system that facilities a simplified brewing process while maintaining the beverage at a cooled temperature would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance defining a vertical direction is provided. The refrigerator appliance includes a cabinet that defines a chilled chamber for receipt of food articles for storage, a dispensing assembly including an outlet for selectively dispensing a flow of water, and a brewing assembly positionable within the cabinet for receiving the flow of water from the dispensing assembly. The brewing assembly includes a pitcher removably positioned within the chilled chamber below the outlet of the dispensing assembly, a brew module positioned within the pitcher and including one or more canisters for receiving brewing contents and the flow of water from the dispensing assembly to create a brewed beverage, and a lower reservoir positioned below the brew module for receiving the brewed beverage from the one or more canisters.

In another exemplary embodiment, a brewing assembly for a refrigerator appliance includes a dispensing assembly for selectively dispensing a flow of water, a pitcher removably positioned within the refrigerator appliance and being fluidly coupled to the dispensing assembly, and an upper reservoir positioned within the pitcher for receiving the flow of water from the dispensing assembly. A brew module is positioned within the pitcher below the upper reservoir and includes a plurality of canisters for receiving brewing contents and the flow of water from the upper reservoir to create a brewed beverage and a lower reservoir is positioned below the brew module for receiving the brewed beverage from the plurality of canisters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
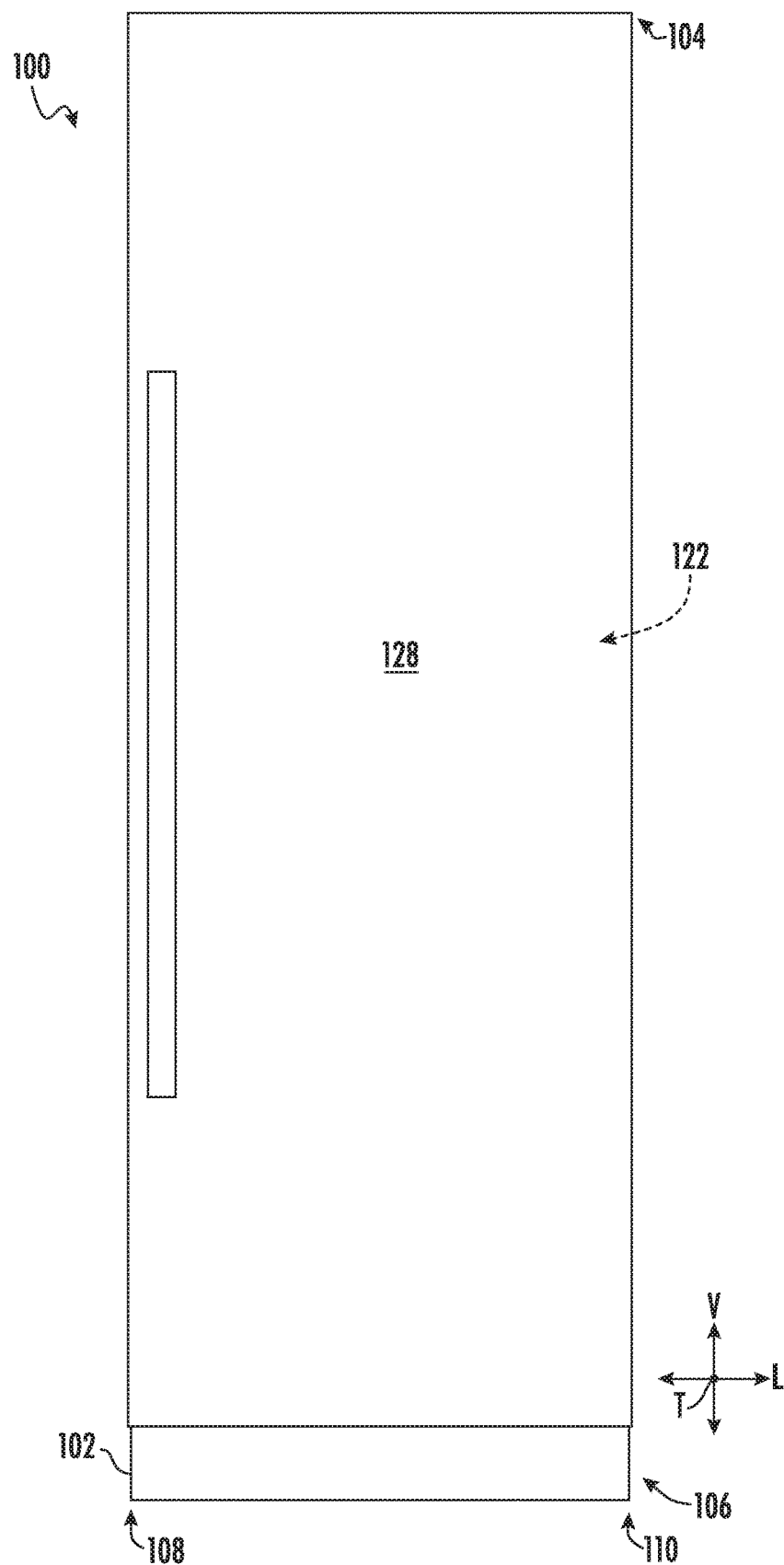
FIG. 1 provides a front view of a refrigerator appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a refrigerator appliance 100 according to an exemplary embodiment of the present subject matter. For this embodiment, refrigerator appliance 100 is a built-in or column refrigerator appliance configured to be built into a wall or cabinetry. However, the inventive aspects of the present disclosure apply to other types and styles of refrigerator appliances, such as e.g., bottom mount refrigerator appliances, top mount refrigerator appliances, side-by-side refrigerator appliances, etc. Consequently, the description set forth herein is for illustrative purposes only and is not intended to be limiting in any aspect to any particular refrigerator appliance type or configuration.

Refrigerator appliance 100 includes a cabinet or housing 102 that extends between a top 104 and a bottom 106 along a vertical direction V, between a first side 108 and a second side 110 along a lateral direction L, and between a front side and a rear side along a transverse direction T (a direction extending into and out of the page in FIG. 1). Each of the vertical direction V, lateral direction L, and transverse direction T are mutually perpendicular to one another and form an orthogonal direction system.

Housing 102 includes an insulated liner 120 which at least partially defines a chilled chamber for receipt of food items for storage. In particular, housing 102 and/or liner 120 defines a fresh food chamber 122. Thus, column refrigerator appliance 100 is a single purpose unit in this example embodiment. Refrigerator door 128 is rotatably mounted to an edge of housing 102 for selectively accessing fresh food chamber 122. Refrigerator door 128 is shown in the closed configuration in FIG. 1. One skilled in the art will appreciate that other chamber and door configurations are possible and within the scope of the present invention.

Figure 2:
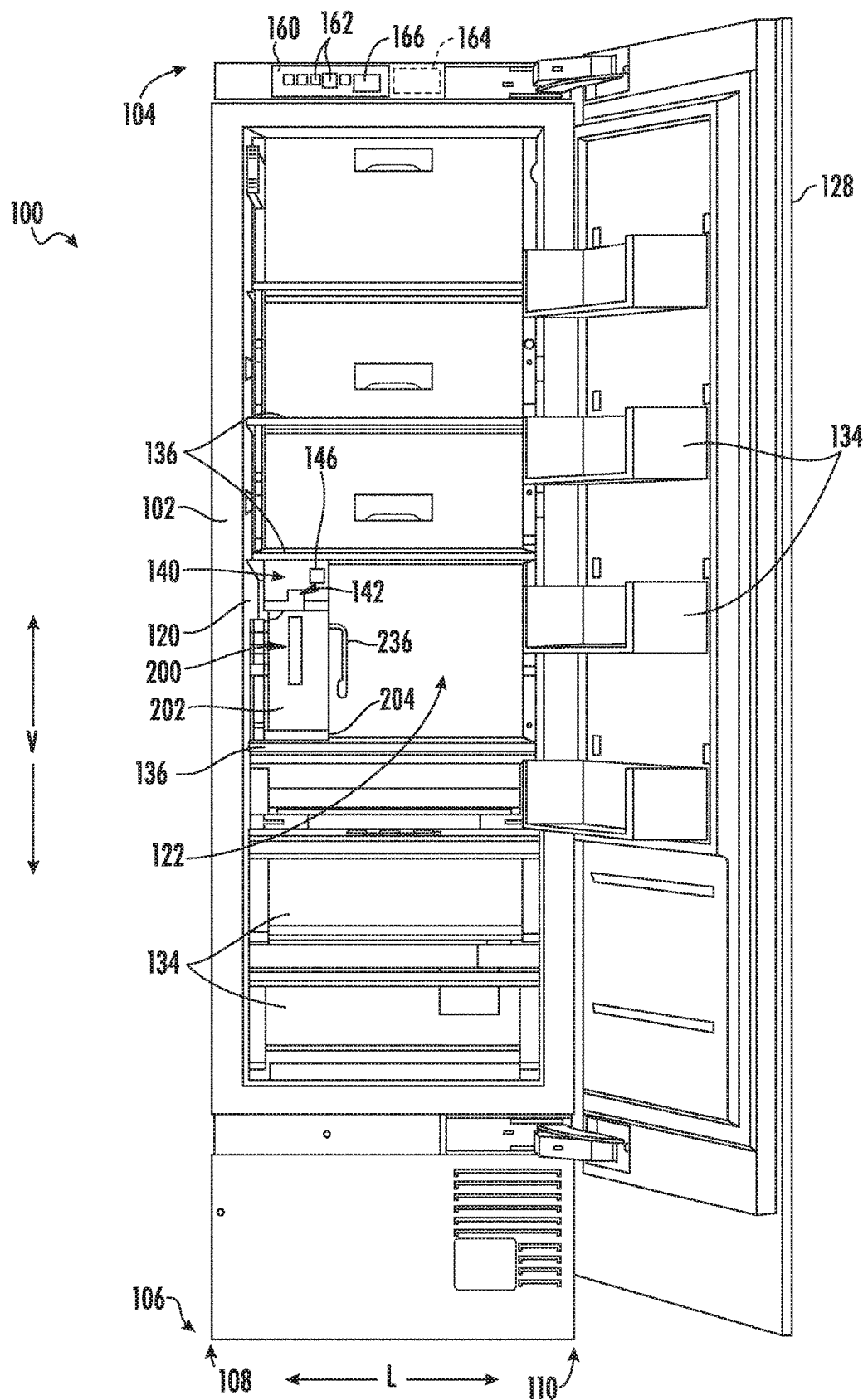
FIG. 2 provides a front view of the exemplary refrigerator appliance of FIG. 1 with a refrigerator door in an open position.

FIG. 2 provides a front view of refrigerator appliance 100 shown with refrigerator door 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator door 128 or may slide into a receiving space in fresh food chamber 122. It should be appreciated that the illustrated storage components are used only for the purpose of explanation and that other storage components may be used and may have different sizes, shapes, and configurations.

Referring still to FIG. 2, a dispensing assembly 140 will be described according to exemplary embodiments of the present subject matter. Dispensing assembly 140 is generally configured for dispensing liquid water for consumption and/or to facilitate a cold brew process as described below. Although an exemplary dispensing assembly 140 is illustrated and described herein, it should be appreciated that variations and modifications may be made to dispensing assembly 140 while remaining within the present subject matter.

As illustrated, dispensing assembly 140 and its various components may be positioned within fresh food chamber 122. By contrast, according to alternative embodiments, dispenser assembly 140 may be positioned on a front side of refrigerator appliance 100 (e.g., on refrigerator door 128) such that a user may operate dispensing assembly 140 without opening refrigerator door 128. As illustrated, dispensing assembly 140 includes a water outlet 142 for selectively dispensing the flow of water (e.g. identified herein by reference numeral 144). Dispensing assembly 140 may further include an actuation mechanism 146, shown as a push button, for selectively dispensing the flow of water 144 or initiating a cold brew process. In alternative exemplary embodiments, any suitable actuating mechanism may be used to operate dispensing assembly 140, such as an ultrasonic sensor that detects the presence of a container, a paddle, an input on a refrigerator control panel, etc.

Refrigerator appliance 100 includes a control panel 160. Control panel 160 includes one or more input selectors 162, such as e.g., knobs, buttons, push buttons, touchscreen interfaces, etc. In addition, input selectors 162 may be used to specify or set various settings of refrigerator appliance 100, such as e.g., settings associated with a cold brew coffee system as will be explained further below. Input selectors 162 may be in communication with a processing device or controller 164. Control signals generated in or by controller 164 operate refrigerator appliance 100 in response to input selectors 162. Additionally, control panel 160 may include a display 166, such as an indicator light or a screen. Display 166 is communicatively coupled with controller 164 and may display information in response to signals from controller 164. Further, as will be described herein, controller 164 may be communicatively coupled with other components of refrigerator appliance 100, such as e.g., one or more sensors and components of a cold brew coffee system.

As used herein, "processing device" or "controller" may refer to one or more microprocessors or semiconductor devices and is not restricted necessarily to a single element. The processing device can be programmed to operate refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

As further shown in FIG. 2, refrigerator appliance 100 includes a brewing assembly 200 disposed within fresh food chamber 122. Generally, brewing assembly 200 is configured to cold brew a beverage within refrigerator appliance 100. In this regard, for example, the embodiment described herein describes brewing assembly 100 as being used to make cold brew coffee using coffee grounds. However, it should be appreciated that according to alternative embodiments, brewing assembly 200 may use any other type of brewing contents to brew any other brewed beverage, e.g., such as tea leaves to make cold brew tea.

Figure 3:
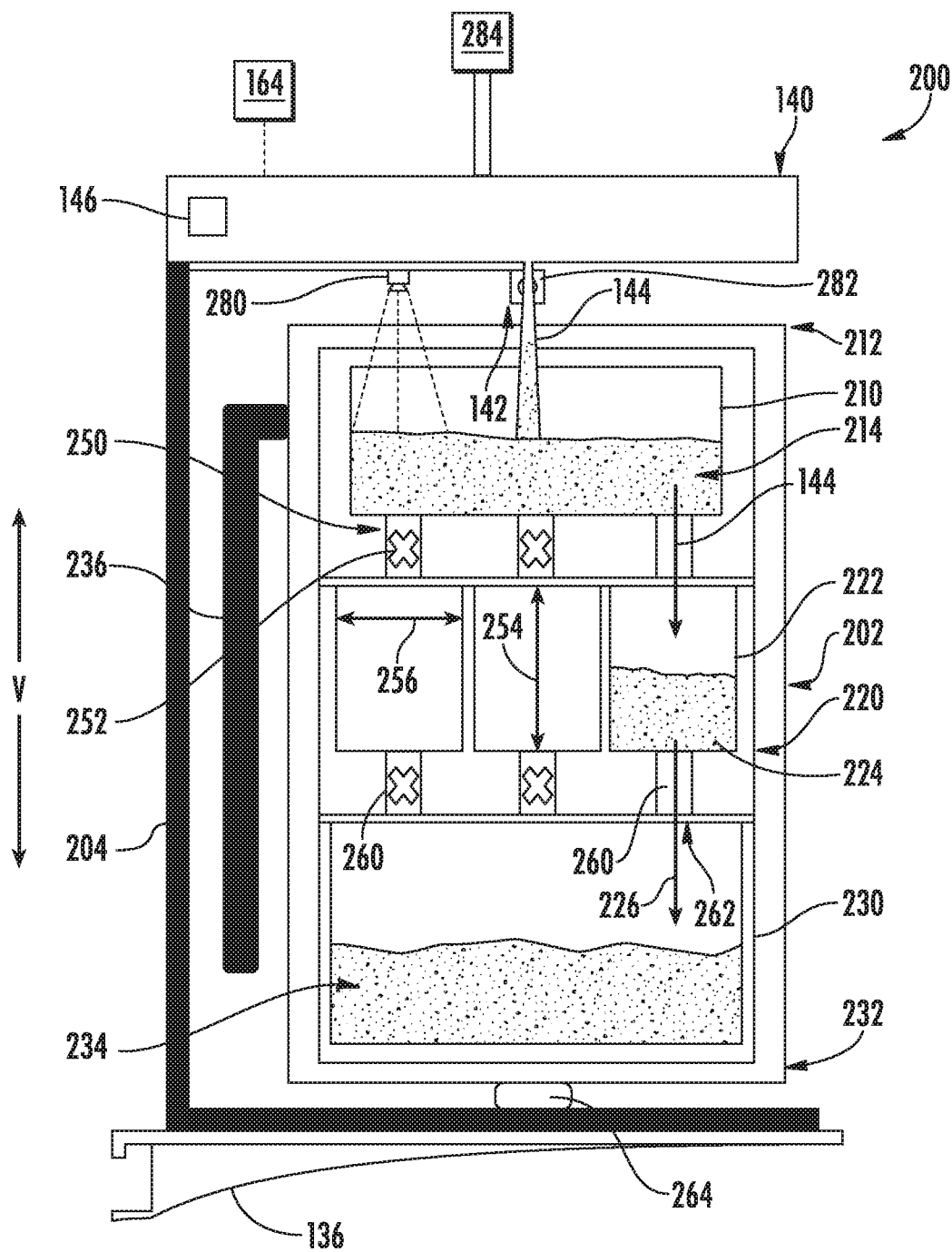
FIG. 3 provides a schematic view of a brewing assembly that may be used with the exemplary refrigerator appliance of FIG. 1 according to an exemplary embodiment of the present subject matter.
Figure 4:
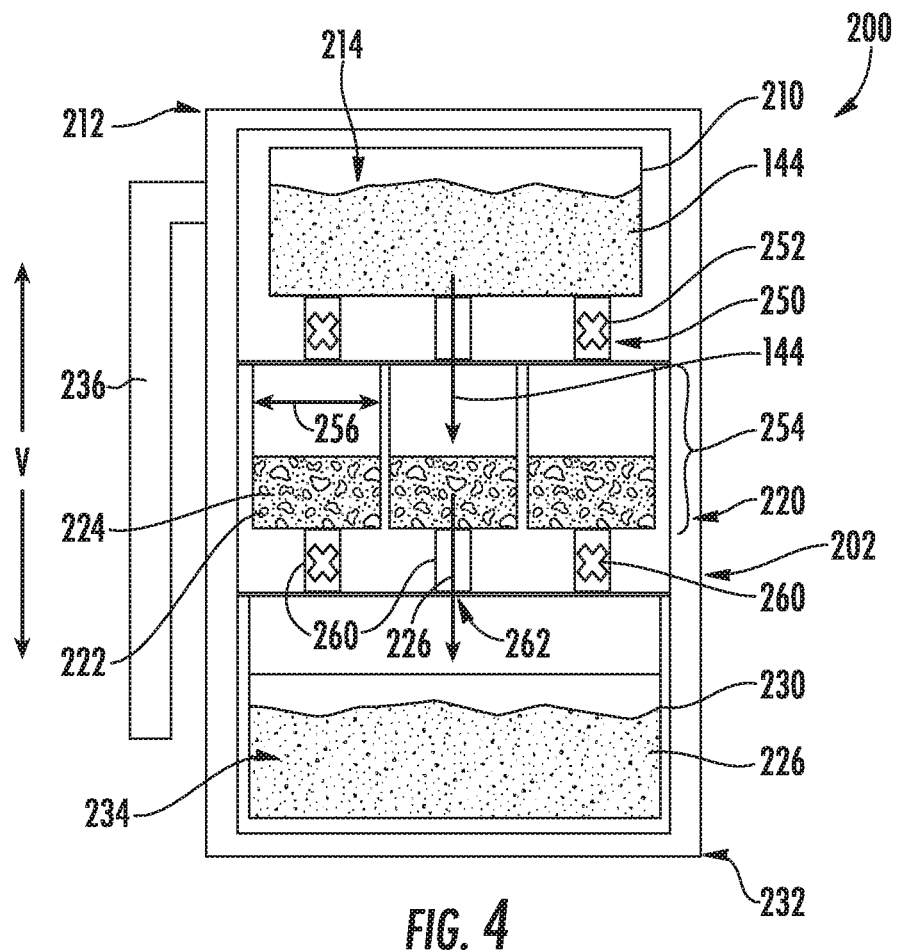
FIG. 4 provides a schematic view of a pitcher of the exemplary brewing assembly of FIG. 3 according to an exemplary embodiment of the present subject matter.

As illustrated in the front view of FIG. 2 and the schematic view of FIG. 3, brewing assembly 200 includes a pitcher 202 which is removably positioned within the fresh food chamber 122 within pitcher housing 204. Specifically, as illustrated, pitcher housing 204 may be a bracket or receptacle fixed within fresh food chamber 122 for removably receiving pitcher 202 and securing it in place during a brewing process. In addition, pitcher housing 204 may be configured for placing pitcher 202 fluid communication with dispensing assembly 140 of refrigerator appliance 100. In this manner, according to an exemplary embodiment, controller 164 may operate dispensing assembly 140 perform an autofill process to facilitate the cold brew process. For example, a user may commence the cold brew process by pressing actuation mechanism 146 and dispensing assembly 140 may automatically selectively dispense the flow of water 144 at the desired times and flow rates to facilitate the cold brew process as described below.

Although pitcher housing 204 is illustrated herein as being mounted within fresh food chamber 122 and being configured for receiving and supporting pitcher 202, it should be appreciated that according to alternative embodiments, no pitcher housing 204 may be needed at all. In this regard, for example, pitcher 202 may be supported by one of shelves 136 which may have a dedicated spot or recess for receiving pitcher 202. Alternatively, another suitable structure such as insulated liner 120 of refrigerator appliance 100 may secure pitcher 202 in position underneath dispensing assembly 140. Although an exemplary brewing assembly 200 is described below, it should be appreciated that variations and modifications may be made to dispensing assembly 140, brewing assembly 200, and other features of refrigerator appliance 100 while remaining within the scope of the present subject matter.

Referring now specifically to FIG. 3, brewing assembly 200 includes an upper reservoir 210 positioned within pitcher 202 at a top 212 of pitcher 202. Upper reservoir 210 generally defines an upper storage volume 214 which is fluidly coupled with outlet 142 of dispensing assembly 140 when pitcher 202 is placed in the installed position within pitcher housing 204. As described in detail below, upper reservoir 210 may be periodically filled with water 144 by dispensing assembly 140 to facilitate the cold brew process.

Brewing assembly 200 may further include a brew module 220 positioned within pitcher 202 below upper reservoir 210. As illustrated, brew module 220 includes one or more canisters 222 for receiving brewing contents (e.g., identified herein by reference numeral 224) and the flow of water 144 selectively dispensed from upper reservoir 210 to create a brewed beverage (e.g., illustrated herein by reference numeral 226). Thus, the flow of water 144 may seep or pass slowly through brewing contents 224, e.g., coffee grounds, to extract flavor from brewing contents 224 and make the brewed beverage 226. According to the illustrated embodiment, brew module 220 is positioned below upper reservoir 210 along the vertical direction V to facilitate a gravity assisted brewing process.

Brewing assembly 200 may further include a coffee container or lower reservoir 230 which is positioned below brew module 220 (e.g., at a bottom 232 of pitcher 202) for receiving brewed beverage 226 from canisters 222. As illustrated in FIG. 3, lower reservoir 230 defines a lower storage volume 234 which is configured for receiving and storing all of brewed beverage 226 after the cold brew process is completed. According to an exemplary embodiment, upper storage volume 214 is less than lower storage volume 234. Thus, in order to fill lower storage volume 234, dispensing assembly 140 is generally configured for filling upper reservoir 210 two or more times during a brewing process. In this manner, dispensing assembly 140 need not be continuously operated throughout a brewing process, but may instead periodically fill upper reservoir 210 which may then selectively dispense the flow of water 144 at a slower rate as described in detail below.

Notably, according to the illustrated embodiment, brewing assembly 200 includes a handle 236 that is mounted to pitcher 202 for removing pitcher 202 altogether from refrigerator appliance 100. Thus, in order to access brewed beverage 226, pitcher 202 may define an outlet conduit (not shown) and an outlet spout (not shown). In this regard, the outlet conduit may extend from lower reservoir 230 to the outlet spout for dispensing brewed beverage 226 for consumption. Notably, according to such embodiments, upper reservoir 210, brew module 220, and lower reservoir 230 are substantially self-enclosed such that pitcher 202 does not leak when a user tilts to pour brewed beverage 226.

However, it should be appreciated that according to alternative embodiments, brewing assembly 200 may include any other suitable means for pouring or providing access to brewed beverage 226. For example, according to an alternative embodiment, pitcher 202 may include a pivoting access panel (e.g., similar to access panel 270 described below) which a user may open to remove lower reservoir 230 from pitcher 202 after the cold brew process is complete. According such an embodiment, lower reservoir 230 may further include a separate handle (not shown) to facilitate easy pouring of brewed beverage 226.

As mentioned briefly above, upper reservoir 210 may be periodically filled by dispensing assembly 140 which may then selectively dispense a flow of water 144 into brew module 220. In this regard, upper reservoir 210 may include one or more drip passages 250 which fluidly connect upper storage volume 214 and brew module 220. For example, according to the illustrated embodiment, a single drip passage 250 extends substantially along the vertical direction V from upper reservoir 210 to a nozzle positioned immediately above each of canisters 222. In this manner, drip passages 250 may dispense the flow of water 144 directly into each of canisters 222 of brew module 220.

According to an exemplary embodiment, drip passages 250 are sized so that water 144 drips from upper storage volume 214 into canisters 222 at a desired flow rate. According to the illustrated embodiment, brewing assembly 200 includes a plurality of water dispensing valves 252 which are fluidly coupled to upper reservoir 210 for regulating the flow of water 144 through drip passages 250. Specifically, as illustrated schematically in FIG. 3, water dispensing valves 252 are fluidly coupled to drip passages 250 for permitting water 144 to drip slowly into canisters 222 during the brewing process, for regulating the residence time of the water within beverage contents 224, or for otherwise regulating the brewing process.

Notably, the quality of brewed beverage 226 may be improved by maintaining a desired ratio of water 144 to beverage contents 224. In addition, it may be desirable to increase the residence time of water 144 within brewing contents 224, e.g., to permit water 144 to extract more flavor from brewing contents 224 (or otherwise regulate such time to control coffee strength). Thus, according to an exemplary embodiment, each of canisters 222 are elongated along the vertical direction V and receive a slow drip of water 144 to achieve a stronger brewed beverage 226.

More specifically, each of the canisters 222 may define a height 254 measured along the vertical direction V and an average diameter 256, e.g., measured perpendicular to the vertical direction V. According to an exemplary embodiment, height 254 is greater than two times average diameter 256. According to still other embodiments, height 254 may be greater than four times average diameter 256 or the ratio of height 254 over average diameter 256 may be even larger, such as 5:1, 10:1, or greater. In this manner, by dripping water 144 from a plurality of drip passages 250 slowly into elongated canisters 222, the water is able to extract the most flavor from beverage contents 224.

In addition, according to an exemplary embodiment, brew module 220 may further include one or more brew valves 260 which are configured for regulating the flow of brewed beverage 226 from brew module 220 into lower reservoir 230. Specifically, each canister 222 may define a canister outlet 262 for selectively dispensing the brewed beverage 226 from that canister 222. If a stronger beverage is desired or if it is desirable to stop the brewing process, brew valves 260 may be closed to stop the flow of brewed beverage into lower reservoir 230. According to an exemplary embodiment, controller 164 may regulate the operation of water dispensing valves 252, brew valves 260, etc.

Notably, the use of upper reservoir 210, water dispensing valves 252, and brew valves 260 increase versatility in the brewing process. For example, the brewing process may be slowed down or sped up as desired to control the strength of brewed beverage 226. In addition, the brewing process may be confined to a particular drip passage 250 and respective canister 222. In this regard, according to another embodiment, lower reservoir 230 may be removed and replaced by a smaller reservoir, e.g., such as a cup (not shown) for directly receiving brewed beverage 226. Thus if a user prefers to brew a single cup at a time, the cop may be positioned underneath a single canister 222 filled with beverage contents 224. The user may then use control panel inputs 162 to specify which water dispensing valve 252 and brew valve 260 to use to facilitate the brew process and to supply brewed beverage 226 into the cup. According to still other embodiments, cup proximity or detection sensors may be used to automatically determine which valves should be used. Notably, as brewing assembly 200 is positioned within fresh food chamber 122 of refrigerator appliance 100 (FIG. 2), the brewed beverage 226 that has dripped into lower reservoir 230 or the cup is maintained at a chilled temperature and is thus instantly ready for consumer consumption at the chilled temperature.

As illustrated in FIG. 3, brewing assembly 200 may further include a weight sensor 264 which is generally configured or detecting the weight of or quantity of beverage contents 224 deposited in canisters 222 in order to determine the proper amount of water 144 which should be supplied from upper reservoir 210. Specifically, as illustrated, weight sensor 224 may be a load cell or other suitable weight measuring mechanism positioned on pitcher housing 204 or on top of shelf 136 for detecting the weight of pitcher 202. In this regard, controller 164 may be configured for measuring the weight of pitcher 202 before and after beverage contents 224 are added. In this manner, dispensing assembly 140 and water dispensing valves 252 may be regulated appropriately to provide the desired amount and flow rate of water 144 to create brewed beverage 226.

Figure 5:
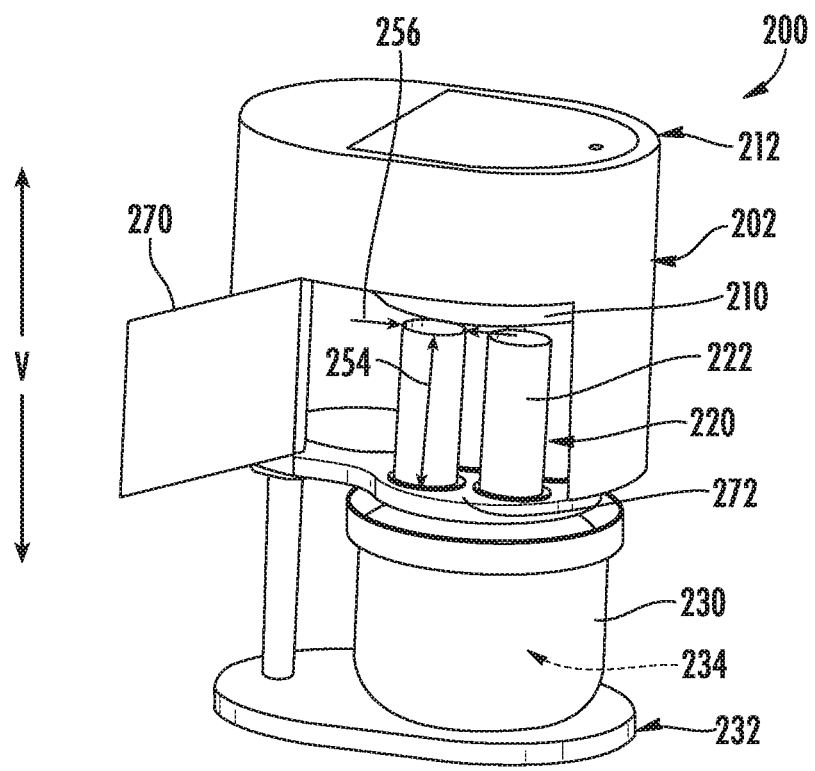
FIG. 5 provides a perspective view of a brewing assembly according to an exemplary embodiment of the present subject matter.
Figure 6:
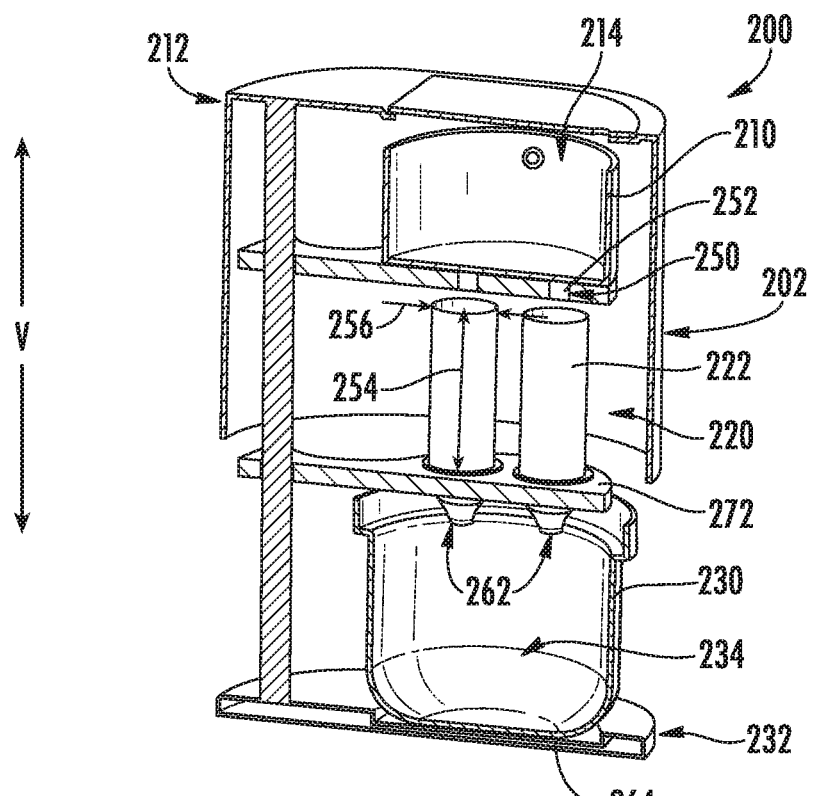
FIG. 6 provides a cross sectional view of the exemplary brewing assembly of FIG. 5 according to an exemplary embodiment of the present subject matter.

As best illustrated in FIGS. 5 and 6, brew module 220 may further include an access panel 270 which provides selective access to brew module 220. In this regard, access panel 270 may be pivoted to an open position to permit a user to fill canisters 222 with brewing contents 224 or to otherwise access components within pitcher 202. In addition, brew module 220 may include a rotatable plate 272 which is configured for receiving canisters 222. In this manner, a user may rotate rotatable plate 272 to facilitate easy access to each canister 222 or to otherwise service pitcher 202 and its components. In some embodiments, access panel 270 extends the full vertical length of pitcher 202, e.g., to permit access to upper reservoir 210, brew module 220, and/or lower reservoir 230. In other embodiments such as illustrated, access panel 270 need not extend the full vertical length of pitcher 202.

In some alternative embodiments, brew module 220 may be a removable bin (not shown) which is movable between an installed position and an uninstalled position. In this regard, the removable bin may include a handle which a user may grasp to remove brew module 220, to clean canisters 222, to load canisters 222 with beverage contents 224, or to otherwise access regions within pitcher 202. After canisters 222 have been loaded with the desired amount of beverage contents 224, a user may install module 220 back into the installed position and close access panel 270. It should be appreciated that brewing assembly 200 may have different configurations, other access means, and additional or alternative subassemblies for facilitating the cold brew process. Such variations and modifications are deemed to be within scope of the present subject matter.

Referring again to FIG. 3, dispensing assembly 140 may include features for performing an autofill process to fill upper reservoir 210. Specifically, for example, dispensing assembly 140 may include a water level sensor 280 which is configured for detecting a level of water within upper reservoir 210. Thus, water level sensor 280 may be positioned on a bottom surface of dispensing assembly 140 for detecting a water level within upper reservoir 210. An inlet valve 282 is movable between an open position and a closed position for selectively allowing water 144 to flow from a water supply 284 to upper reservoir 210. In the open position, inlet valve 282 allows water to flow from water supply 284 to upper reservoir 210. In the closed position, inlet valve 282 prevents water from flowing from water supply 284 to upper reservoir 210.

In some embodiments, inlet valve 282 is a normally closed solenoid valve. Controller 164 or another processing device dedicated to brewing assembly 200 is communicatively coupled with inlet valve 282. For instance, upon initiation of a cold brewing process by a user input, e.g., via one of input selectors 162 (FIG. 2), controller 164 may control inlet valve 282 to move to the open position so that water may flow from water supply 284 to upper reservoir 210. For instance, controller 164 may send an activation signal to energize inlet valve 282 so that inlet valve 282 moves to the open position. When water within upper reservoir 210 has reached a predetermined water level (e.g., as determined by water level sensor 280), controller 164 may control inlet valve 282 to move to the closed position.

According to the illustrated embodiment, water level sensor 280 is an infrared sensor for detecting the water level within upper reservoir 210. However, it should be appreciated that any other suitable water level measuring mechanism may be used according to alternative embodiments. For example, water level sensor 280 could alternatively include a float and reed switch assembly, a capacitive sensor, etc. Water level sensor 280 is communicatively coupled with controller 164, e.g., so that one or more signals may be routed therebetween. In some embodiments, water level sensor 280 is directly communicatively coupled with inlet valve 282 (e.g., via a wired or wireless connection).

As described above, controller 164 may be communicatively coupled to brewing assembly 200 and its various components, such as water dispensing valve 252, weight sensor 264, water level sensor 280, etc. However, it should be appreciated that controller 164 may also permit wireless control and/or communication with a user of brewing assembly 200. For example, controller 164 might be connected to a mobile device, tablet, laptop, or other consumer device through any suitable wired or wireless connection. Such communication between controller 164 and a user's mobile device may facilitate monitoring and/or control of the brewing process. For example, a user may remotely initiate a brewing process, may monitor the amount of brewed beverage 226 by measuring the weight utilizing weight sensor 264, or may communicate with brewing assembly 200 or refrigerator appliance 100 for any other suitable purpose.

Now that the construction of refrigerator appliance 100 and brewing assembly 200 have been described according to an exemplary embodiment, an exemplary method 300 of performing a cold brew process will be described. Although the discussion below refers to the exemplary method 300 of operating brewing assembly 200, one skilled in the art will appreciate that the exemplary method 300 is applicable to the operation of a variety of other brewing system configurations and methods of operation. In exemplary embodiments, the various method steps as disclosed herein may be performed by controller 164.

Figure 7:
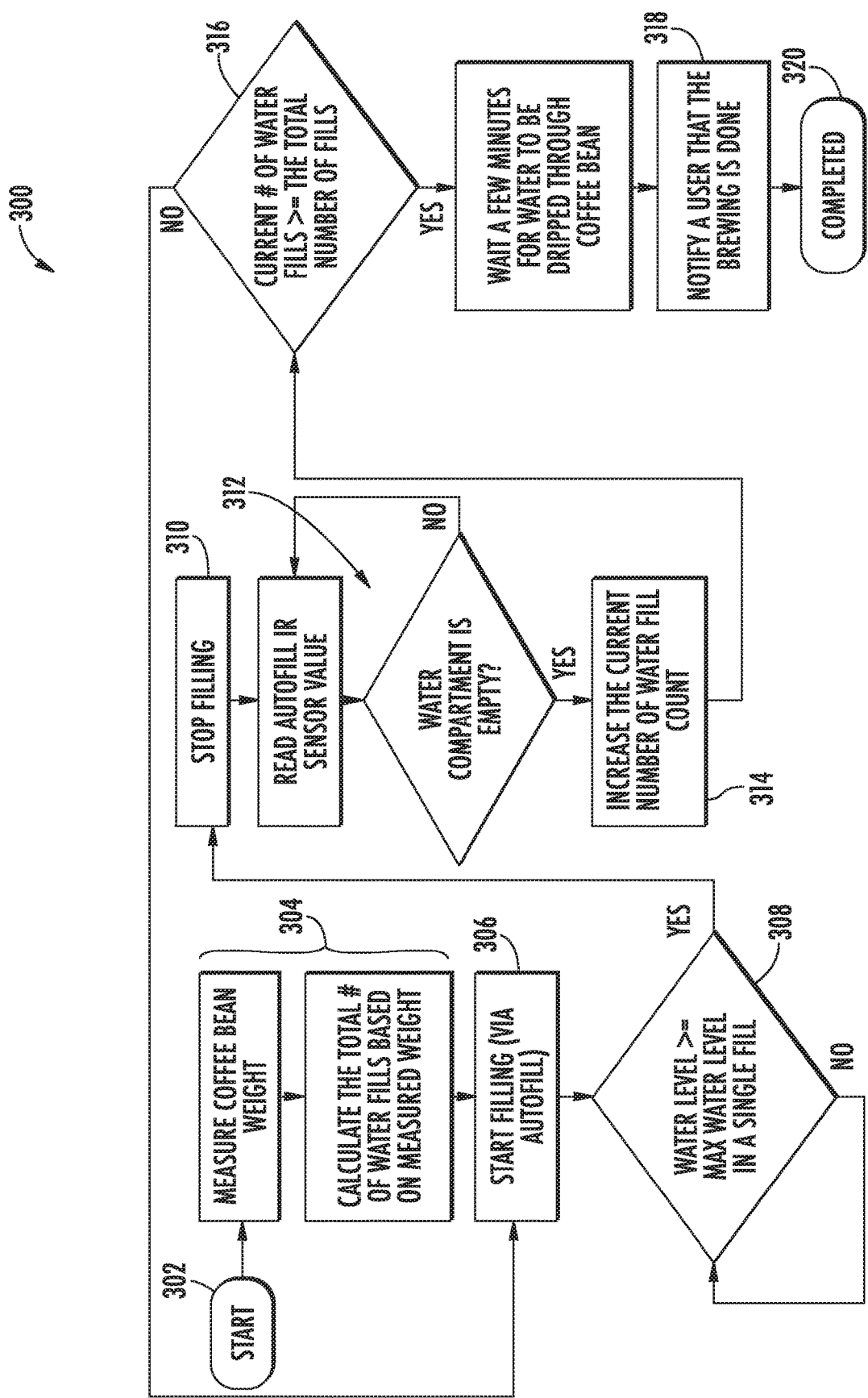
FIG. 7 provides a flow diagram of an exemplary method for cold brewing coffee utilizing the exemplary brewing assembly of FIG. 3 according to an exemplary embodiment of the present subject matter.

Referring now to FIG. 7, method 300 includes, at step 302, starting a cold brew process. In this regard, a user may manipulate control panel 160 or press actuation mechanism 146 in order to initiate an autofill process and commence a cold brew process. According to an exemplary embodiment, the autofill process is based at least in part on the weight of beverage contents 224. Thus, step 304 may include measuring the coffee bean weight and calculating the total volume of water 144 required for the brewing process. Specifically, as illustrated, controller 164 may divide the desired brew volume, e.g., the volume which will fill lower storage volume 234, by upper storage volume 214 to determine the number of times upper storage volume 214 must be filled to complete the brewing process.

Step 306 includes starting to fill process, e.g., by opening inlet valve 282. Step 308 includes continuing the fill process until the level of water 144 within upper reservoir 210 reaches the max volume or a fill volume. In this regard, for example, water level sensor 280 may monitor the level of water within upper reservoir 210 and shut inlet valve 282 (e.g., at step 310) when upper reservoir 210 is filled. Step 312 generally includes monitoring the water level within upper reservoir 210 until it reaches an empty or low volume level at which time inlet valve 282 will be reopened and the number of fills calculated at step 304 will be decreased by one (e.g. at step 314).

This process will be repeated until controller 164 determines at step 316 that upper reservoir 210 has been filled the desired number of times to achieve the desired brew volume within lower reservoir 230. After the final volume within upper reservoir 210 is dispensed into brew module 220, controller 164 may wait a predetermined amount of time before providing a notification to the user at step 318 that the brewing process is complete. At step 320, the brew process is terminated, all valves are closed, etc. Advantageously, a user need not transport the brewed beverage 226 into refrigerator appliance 100 as it is already located therein.

FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using brewing assembly 200 as an example, it should be appreciated that these methods may be applied to the operation of any suitable brewing system in any refrigerator appliance.

The brewing assembly 200 described herein provide a number of benefits and advantages. For instance, coffee grounds may be steeped with chilled water as opposed to room temperature water. The temperature of the water mixed with the coffee grounds may be maintained as the brewing assembly 200 is positioned within a chilled chamber of a refrigerator appliance. Further, after the brewed coffee has dripped into the coffee container, there is no need to move the coffee container to a chilled chamber to chill the brewed coffee to the desired temperature. As noted above, this is because brewing assembly 200 is positioned within a chilled chamber. Additionally, as brewing assembly 200 is integrated into a refrigerator appliance, there is no need for a consumer to purchase a dedicated cold brew coffee system. Accordingly, valuable countertop or storage space may be utilized for other objects. The brewing assembly 200 described herein may have other advantages and benefits not explicitly listed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, the refrigerator appliance comprising:
    a cabinet that defines a chilled chamber for receipt of food articles for storage;
    a dispensing assembly comprising an outlet for selectively dispensing a flow of water; and
    a brewing assembly positionable within the cabinet for receiving the flow of water from the dispensing assembly, the brewing assembly comprising:
        a pitcher removably positioned within the chilled chamber below the outlet of the dispensing assembly;
        a brew module positioned within the pitcher and comprising one or more canisters for receiving brewing contents and the flow of water from the dispensing assembly to create a brewed beverage; and
        a lower reservoir positioned below the brew module for receiving the brewed beverage from the one or more canisters.

2. The refrigerator appliance of claim 1, wherein the brewing assembly comprises:
    an upper reservoir positioned above the brew module for receiving an upper storage volume of the flow of water from the dispensing assembly and selectively dispensing the upper storage volume into the one or more canisters.

3. The refrigerator appliance of claim 2, wherein the one or more canisters comprises a plurality of canisters, and wherein the brewing assembly comprises:
a plurality of water dispensing valves fluidly coupled to the upper reservoir, each of the plurality of water dispensing valves being positioned over one of the plurality of canisters to regulate the flow of water into the respective one of the plurality of canisters.

4. The refrigerator appliance of claim 2, wherein the lower reservoir has a lower storage volume, the upper storage volume being less than the lower storage volume.

5. The refrigerator appliance of claim 2, wherein the dispensing assembly is configured for filling the upper reservoir two or more times during a brew process.

6. The refrigerator appliance of claim 2, wherein the brewing assembly comprises:
a water level sensor for detecting a level of water within the upper reservoir.

7. The refrigerator appliance of claim 6, wherein the water level sensor is an infrared sensor mounted within the chilled chamber above the upper reservoir of the refrigerator appliance.

8. The refrigerator appliance of claim 1, comprising:
a controller for implementing an autofill process for providing the flow of water into the upper reservoir.

9. The refrigerator appliance of claim 1, wherein each of the one or more canisters defines a height along the vertical direction and an average diameter, wherein the height is greater than two times the average diameter.

10. The refrigerator appliance of claim 9, wherein the height is greater than four times the average diameter.

11. The refrigerator appliance of claim 1, wherein the one or more canisters are mounted on a rotatable plate within the pitcher.

12. The refrigerator appliance of claim 1, wherein the brew module further comprises:
a brew valve for regulating the flow of brewed beverage from the brew module into the lower reservoir.

13. The refrigerator appliance of claim 1, wherein the brewing assembly further comprises:
a weight sensor for determining a weight of the brewing contents placed into the brew module, wherein the flow of water is regulated based at least in part on the weight of brewing contents.

14. The refrigerator appliance of claim 1, wherein the brewing assembly further comprises:
a pitcher housing mounted within the chilled chamber and being configured for receiving the pitcher and fluidly coupling the dispensing assembly to the pitcher.

15. The refrigerator appliance of claim 1, wherein the brewing contents are ground coffee.

16. A brewing assembly for a refrigerator appliance, the brewing assembly comprising:
a dispensing assembly for selectively dispensing a flow of water;
a pitcher removably positioned within the refrigerator appliance and being fluidly coupled to the dispensing assembly;
an upper reservoir positioned within the pitcher for receiving the flow of water from the dispensing assembly;
a brew module positioned within the pitcher below the upper reservoir and comprising a plurality of canisters for receiving brewing contents and the flow of water from the upper reservoir to create a brewed beverage;
a lower reservoir positioned below the brew module for receiving the brewed beverage from the plurality of canisters; and
a plurality of water dispensing valves fluidly coupled to the upper reservoir, each of the plurality of water dispensing valves being positioned over one of the plurality of canisters to regulate the flow of water into each of the plurality of canisters.

17. The brewing assembly of claim 16, further comprising:
a water level sensor positioned above the upper reservoir for detecting a level of water within the upper reservoir.

18. The brewing assembly of claim 16, wherein each of the plurality of canisters defines a height along the vertical direction and an average diameter, wherein the height is greater than three times the average diameter.

19. The brewing assembly of claim 16, further comprising:
a brew valve for regulating a flow of brewed beverage from the brew module into the lower reservoir.

* * * * *